A. A. TIRRILL.
ELECTRICAL REGULATOR.
APPLICATION FILED OCT. 5, 1911.

1,147,570.

Patented July 20, 1915.
4 SHEETS—SHEET 4.

WITNESSES:

INVENTOR
Allen A. Tirrill
BY
ATTORNEY

UNITED STATES PATENT OFFICE.

ALLEN A. TIRRILL, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL REGULATOR.

1,147,570.

Specification of Letters Patent.   Patented July 20, 1915.

Application filed October 5, 1911.   Serial No. 653,010.

*To all whom it may concern:*

Be it known that I, ALLEN A. TIRRILL, a citizen of the United States, and a resident of Pittsburgh, in the county of Allegheny and State of Pennsylvania, have invented a new and useful Improvement in Electrical Regulators, of which the following is a specification.

My invention relates to electrical regulators, and it has for its object to provide a simple and exceptionally effective regulator of the kind in which the regulation is effected by adjustment of the field excitation of a dynamo-electric machine.

Figure 1:
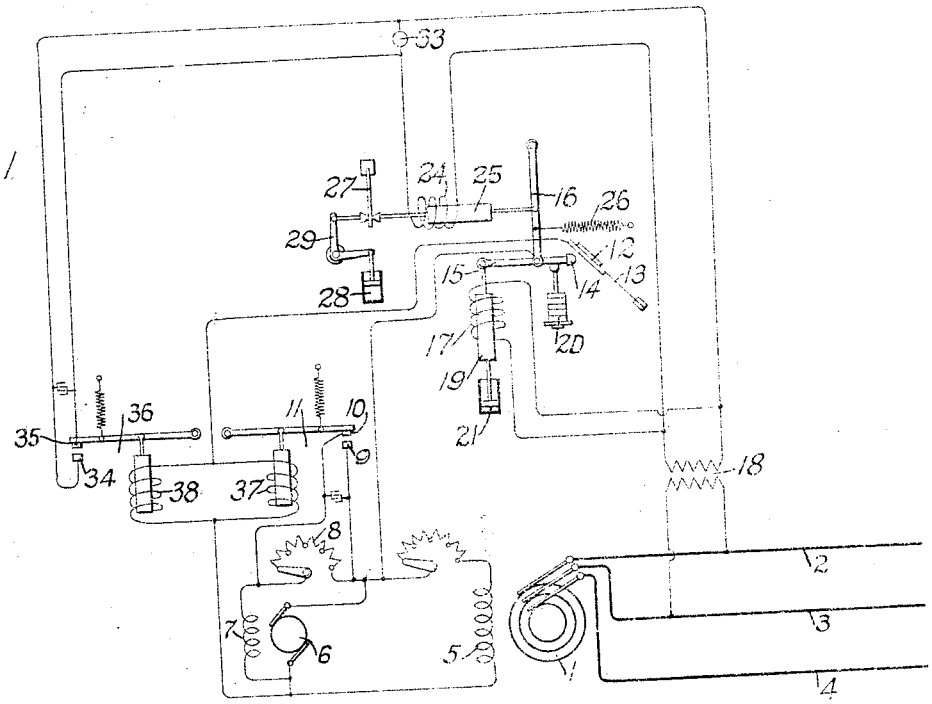
Figure 2:
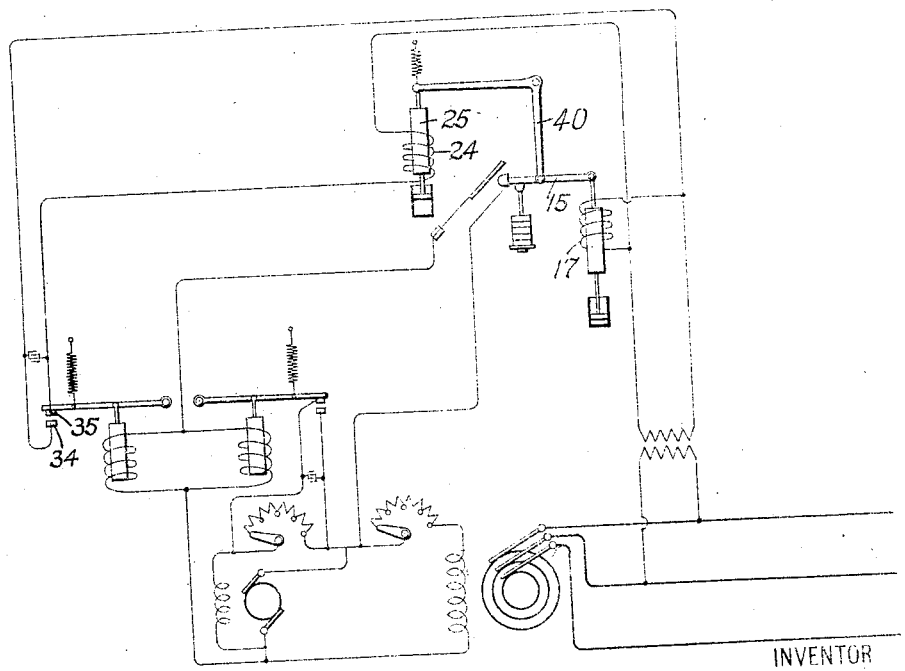

Figure 1 of the accompanying drawings is a diagrammatic view of a system of distribution embodying my invention. Fig. 2 is a similar view of a system embodying a modification of the regulator, and Figs. 3, 4, 5 and 6 are diagrammatic views of systems embodying further modifications of my invention.

A system in connection with which the present invention may be conveniently employed comprises a main generator having an armature 1 that is connected to a suitable distributing circuit 2—3—4 and a field magnet winding 5 that is supplied with exciting current from an exciter 6. The exciter is provided with a field magnet winding 7 that is preferably shunt excited, though it may be supplied with current from any other suitable source, and in series with the said field magnet winding is a resistor 8 that is adapted to be shunted by means of coöperating stationary and movable contact terminals 9 and 10 of a relay 11 constituting a part of the regulator.

The regulator comprises, further, an inclined stationary contact terminal 12 that is resiliently mounted, as by being supported upon the end of a plate spring 13, and a coöperating movable contact terminal 14 that is mounted upon one end of a lever 15. The lever 15 is pivotally supported by an arm 16 and is actuated by an electro-magnet winding 17 that is energized from the circuit 2—3—4, as, for instance, by being connected through a transformer 18 to the conductors 2 and 3. When thus connected, it is energized in proportion to the voltage of the distributing circuit. The winding 17 is provided with a core 19 that is pivotally connected to the lever 15 and is partially counter-balanced by an adjustable counter-weight 20, the winding serving, when sufficiently energized, to raise the said core. The movements of the core 19 are preferably retarded, as, for instance, by means of a dash pot 21. The winding 17 serves to raise and lower the contact terminal 14 and to thereby vary its distance from the stationary contact terminal 12 in response to variations of any selected electrical condition of the distributing circuit, which, as illustrated in Fig. 1, is its voltage.

The lever 16 is actuated, so as to move the contact terminal 14 substantially horizontally into and out of engagement with the stationary contact terminal 12, by means of an electromagnet winding 24 having a core 25, the said core being drawn to the left in opposition to the tension of a spring 26 when the winding 24 is sufficiently energized. The core 25 is supported at one end by means of an arm or spring 27, and its movements are preferably retarded, as, for instance, by means of a dash pot 28 that is connected thereto by means of a bell crank lever 29. The winding 24 also receives energy from the distributing circuit 2—3—4, and a lamp 33, or any other suitable resistor, is connected in series therewith, the said resistor being adapted to be shunted by means of coöperating stationary and movable contact terminals 34 and 35 of a relay 36. The relays 11 and 36 are provided with parallel-connected actuating winding 37 and 38, respectively, that receive energy from the exciter or any other suitable source, and the circuits of which are governed by the contact terminals 12 and 14.

It will be observed that the construction of the apparatus is such that the contact terminal 14 may be actuated independently by the windings 17 and 24, the winding 17, as before stated, serving to vary the distance of the contact terminal 14 from the terminal 12 in response to variations of an electrical condition of the distributing circuit, and the winding 24 serving to move the contact terminal 14 into and out of engagement with the terminal 12 in accordance with variations of the degree of its energization, which variations are caused by the engagement and disengagement of the relay contact terminals 34 and 35.

The mode of operation of the regulator will be best understood from a detailed consideration thereof. When, as illustrated, the contact terminal 14 is out of engagement with the terminal 12, the relay magnet windings 37 and 38 are not energized and, consequently, the contact terminals 9 and 34 do not engage the terminals 10 and 35. The shunt circuit to the resistor 8 is then interrupted and the field excitation and voltage of the exciter are diminished, followed by a diminution of the field excitation and voltage of the main generator. By reason of the reduction of the voltage of the generator, the winding 17 is energized to a less degree and the contact terminal 14 is accordingly slightly raised. When the contact terminals 34 and 35 are not in engagement, the resistor 33 is included in the circuit of the magnet winding 24, with the result that it is less strongly energized, and the spring 26 draws the contact terminal 14 into engagement with the terminal 12. The relay magnet windings 37 and 38 are thereupon energized and the relay contact members are brought into engagement. A shunt circuit to the resistor 8 is thus established, with the result that the field excitation and voltage of the exciter are increased, followed by increases of the field excitation and voltage of the main generator. Then, by reason of the greater energization of the winding 17, the contact terminal 14 is slightly lowered. Upon engagement of the contact terminals 34 and 35, the resistor 33 is shunted and the magnet winding 24 becomes more strongly energized, with the result that the contact terminal 14 is moved out of engagement with the terminal 12. The regulator continues to operate in this manner, the periods of engagement and disengagement of the contact terminals 12 and 14 varying with the position of the contact terminal 14 as determined by the voltage or any other selected electrical condition of the distributing circuit, and in such manner that the said electrical condition will be permitted to vary only slightly from a uniform or required value and will be quickly brought to a condition of stability. By reason of the fact that the winding 24 receives energy from the main circuit, rather than from the exciter circuit, and that its circuit is governed by the relay 36, the regulator very quickly and effectively restores the voltage or other electrical condition to its normal value.

The operation of the regulator is entirely independent of the exciter voltage and of the consequent delays resulting from the retardation due to the inductance of the exciter field circuit, and the regulator is also unaffected in its operation by commutation troubles of the exciter. It also does not require adjustment for different exciter voltages.

The regulator of Fig. 2 differs from that of Fig. 1 in that the lever 16 is replaced by a bell crank lever 40 which permits of vertically suspending the core 25 therefrom, thereby providing a more simple structure. In this figure, the resistor in series with the magnet winding 24 is omitted, and the circuit of the said winding is made and broken by the relay contact terminals 34 and 35. The regulator of Fig. 2, of course, operates substantially like that of Fig. 1.

Figure 3:
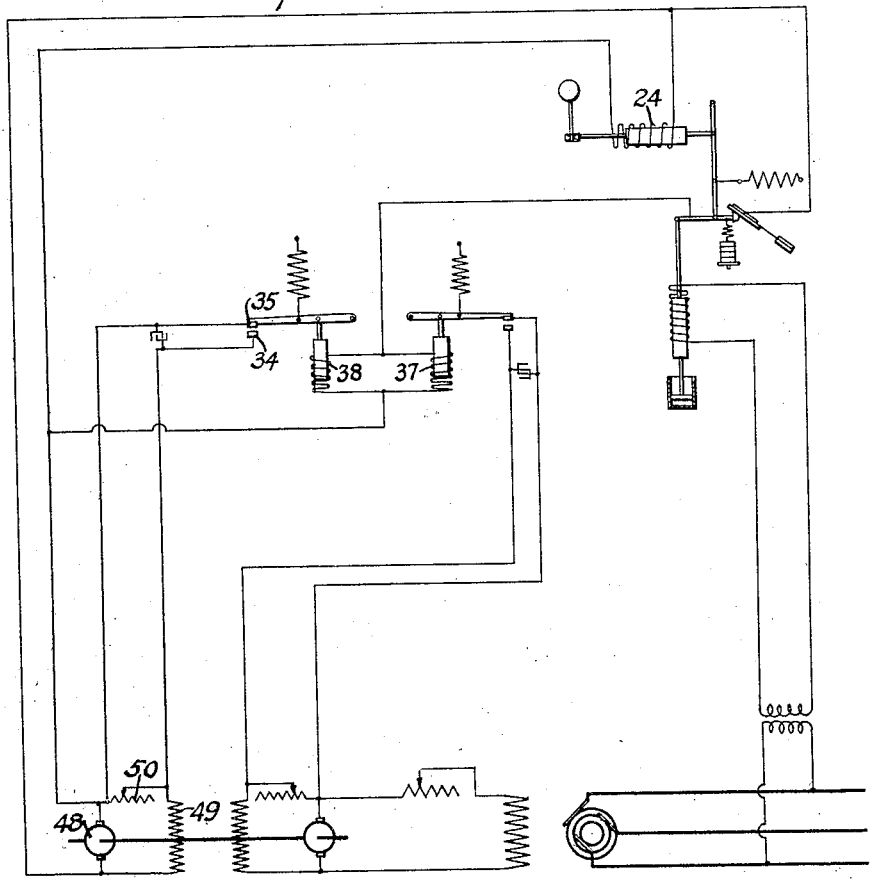

In Fig. 3, the magnet winding 24 is supplied from the armature 48 of a small auxiliary generator that may be driven from the same source of power as the exciter, or from any other suitable source, and in series with the field magnet winding 49 of which is a resistor 50 that is adapted to be shunted by the relay contacts 34 and 35. The field excitation and voltage of the auxiliary generator are thus controlled in substantially the same manner as the field excitation and voltage of the exciter, and the fluctuations of the voltage of the auxiliary generator produce the desired fluctuations of energization of the winding 24. In this figure, also, the relay magnet windings 37 and 38 are supplied from the armature of the auxiliary generator. The mode of operation of the regulator of this figure is substantially like that of the preceding figures.

Figure 4:
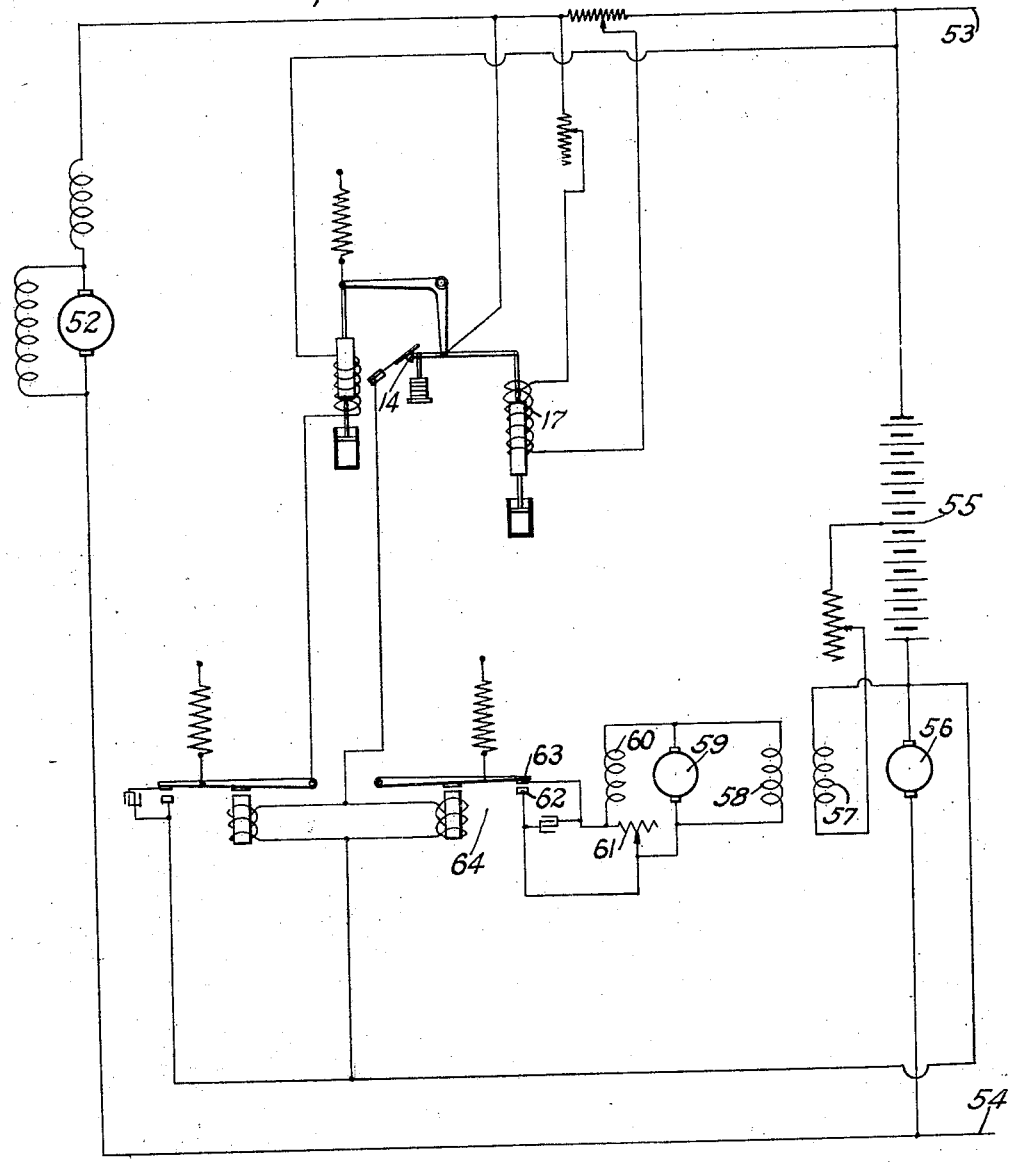

The construction of the regulator of Fig. 4 is similar to that of Fig. 2, but the arrangement of the circuits is such that the regulator operates to maintain a substantially uniform load upon a main generator 52 that supplies a distributing circuit 53—54, a battery 55 being employed for the purpose of relieving the generator of the fluctuations in load. The battery is caused to charge and discharge, according to the condition of the load, by means of a booster, the armature 56 of which is connected in series with the battery. The booster is provided with differential field magnet windings 57 and 58, the former of which is connected between suitable points of the battery and the latter of which is supplied from the armature 59 of an exciter having a field magnet winding 60. In series with the field magnet winding 60 is a resistor 61, the terminals of which are respectively connected to contact members 62 and 63 of a relay 64 corresponding to relay 11 of Figs. 1 and 2. The direction and resultant value of the field excitation of the booster depends upon the relations of the periods of engagement and disengagement of the contact members 62 and 63, and the direction and value of the booster voltage varies in accordance therewith and corresponds thereto. In this system, the actuating winding 17 receives current proportional to that traversing the circuit conductor 53 instead of receiving current proportional to the voltage of the distributing circuit, as in the previous figures. The remainder of the connections of the regulator are substantially like those of Fig. 2.

Since the actuating winding 17 of the regulator receives current proportional to that traversing the circuit conductor 53 between the generator 52 and the battery 55, the position of the movable contact terminal 14 will vary with the slight fluctuations in the value of the said current, and the regulator will operate to maintain the load upon the main generator 52 substantially uniform with fluctuations in the load upon the distributing circuit. Thus, when the load upon the distributing circuit is low, the relation of the periods of engagement and disengagement of the various contact terminals of the regulator will be such that the field excitation of the booster will be of such direction and value that the booster voltage will oppose the voltage of the battery and cause the battery to charge. As the load upon the distributing circuit is increased to substantially its normal value, the periods of engagement and disengagement of the contact members of the regulator will be substantially equal, and the voltage of the booster will accordingly be substantially zero, with the result that the battery floats upon the system. With further increase of the load upon the distributing circuit, the relation of the periods of engagement and disengagement of the various contact members of the regulator becomes such that the voltage of the booster is caused to supplement that of the battery, with the result that the battery discharges and assists the generator in carrying the load.

Figure 5:
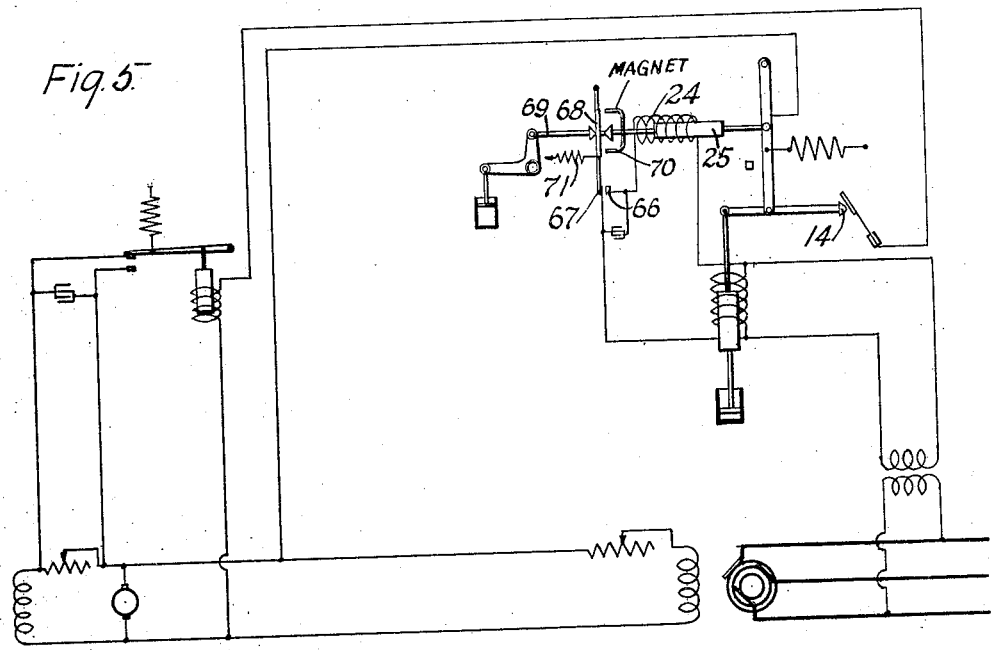

In the system of Fig. 5, the relay 36 is omitted and the circuit of the magnet winding 24 is governed by a pair of coöperating contact members 66 and 67, the latter of which is actuated by the movements of the core 25 of the said winding. The member 67 is carried by an armature 68 that is loosely mounted upon a supporting rod 69 for the core 25, the said rod being provided with enlargements or shoulders upon opposite sides of the armature 68 for effecting movements thereof. A stationary magnet 70 is provided opposite the armature 68 which maintains the member 67 in engagement with the member 66 in opposition to a spring 71 after engagement thereof has been effected by movement of the rod 69. This mechanism insures a positive engagement and disengagement of the members 66 and 67. Thus, the winding 24 serves to open and close its own circuit, and it is periodically energized and deënergized, so that it effects horizontal vibration of the contact terminal 14. In other respects, the operation of this system is like that of systems shown in the preceding figures.

Figure 6:
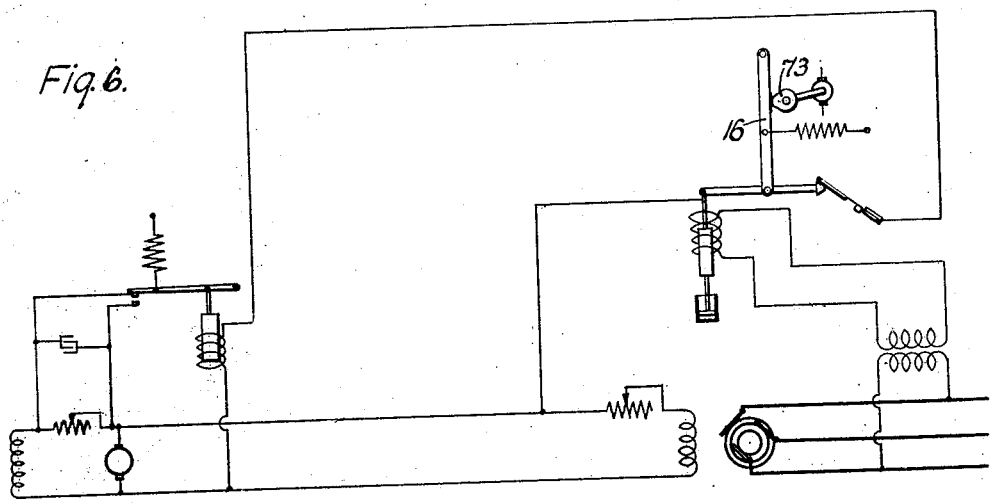

In Fig. 6, both the relay 36 and the winding 24 for effecting horizontal vibration of the contact terminal 14 are omitted, and the horizontal vibrations of the said contact terminal are effected by means of a cam 73 that is driven at a suitable speed by any means and that bears against one face of the lever 16.

While the regulator has been shown as employed for regulating in accordance with variations of voltage or current, it will be readily understood that it may be adapted to meet other requirements and to regulate in accordance with variations of any other electrical condition of a circuit or system without departing from the spirit of the invention. The regulator may be employed for regulating direct current machines as well as alternators.

I claim as my invention:

1. An electrical regulator comprising coöperating contact members, one of which has an inclined contact face, a lever actuating one of said members, a winding for actuating said lever, a second lever providing a fulcrum for the aforesaid lever, and another winding for actuating the said second lever.

2. An electrical regulator comprising coöperating contact members, one of which has an inclined contact face, a lever actuating one of said members, a winding for actuating said lever, a second lever providing a fulcrum for the aforesaid lever, another winding for actuating the said second lever, and means for retarding the movements of said second lever.

3. An electrical regulator comprising coöperating contact members, one of which has an inclined contact face, and one of which is resiliently mounted, a lever actuating one of said members, a winding for actuating the lever, a second lever providing a fulcrum for the aforesaid lever, and another winding for actuating the said second lever.

4. An electrical regulator comprising coöperating contact members, one of which has an inclined contact face, a lever actuating one of said members, a winding for actuating the lever, a second lever providing a fulcrum for the aforesaid lever, and means for vibrating the said second lever.

5. An electrical regulator comprising coöperating contact members, one of which has an inclined contact face, actuating windings for one of said members each of which may actuate the same independently of the other, and means actuated by one of said windings for controlling its own circuit.

6. An electrical regulator comprising coöperating contact members, one of which has an inclined contact face, a lever for actuating one of said members, a winding for actuating said lever, a second lever having its fulcrum above that of the aforesaid lever and providing a fulcrum therefor, and means for actuating the said second lever.

In testimony whereof, I have hereunto subscribed my name this 3rd day of Oct., 1911.

ALLEN A. TIRRILL.

Witnesses:
OTTO S. SCHAIRER,
B. B. HINES.

Copies of this patent may be obtained for five cents each, by addressing the "Commissioner of Patents, Washington, D. C."